(12) United States Patent
Kim

(10) Patent No.: US 7,766,780 B2
(45) Date of Patent: Aug. 3, 2010

(54) CONTINUOUSLY VARIABLE TRANSMISSION

(76) Inventor: Hyun Soo Kim, 592 Saengcheol-ri, Saengnim-myeon, Gimhae-si, Gyeongsangnam-do 621-823 (KR)

( * ) Notice: Subject to any disclaimer, the term of this patent is extended or adjusted under 35 U.S.C. 154(b) by 403 days.

(21) Appl. No.: 11/917,488

(22) PCT Filed: Jun. 12, 2006

(86) PCT No.: PCT/KR2006/002234
§ 371 (c)(1), (2), (4) Date: Dec. 13, 2007

(87) PCT Pub. No.: WO2006/135173
PCT Pub. Date: Dec. 21, 2006

(65) Prior Publication Data
US 2008/0207379 A1 Aug. 28, 2008

(30) Foreign Application Priority Data
Jun. 14, 2005 (KR) .................. 10-2005-0050819

(51) Int. Cl.
*F16H 37/04* (2006.01)
(52) U.S. Cl. ...................... 475/219; 475/221
(58) Field of Classification Search ........... 475/210, 475/219, 221
See application file for complete search history.

(56) References Cited

U.S. PATENT DOCUMENTS

| | | | | |
|---|---|---|---|---|
| 3,934,492 A | * | 1/1976 | Timbs | 475/210 |
| 5,121,936 A | * | 6/1992 | Cowan | 280/236 |
| 5,215,323 A | | 6/1993 | Cowan | |
| 5,409,425 A | * | 4/1995 | Shibahata | 475/5 |
| 6,921,349 B2 | * | 7/2005 | Glockler | 475/210 |

FOREIGN PATENT DOCUMENTS

| | | |
|---|---|---|
| JP | 9-210176 A | 8/1997 |
| JP | 9-315376 A | 12/1997 |
| JP | 11-303953 A | 11/1999 |
| KR | 10-0436744 B1 | 1/2003 |

* cited by examiner

*Primary Examiner*—Ha D. Ho
(74) *Attorney, Agent, or Firm*—Birch, Stewart, Kolasch & Birch, LLP

(57) ABSTRACT

A continuously variable transmission comprises a drive shaft which has first and second drive shafts and is provided with rotational power, a planetary gear unit which is meshed with the first drive gear of the drive shaft and has a sun gear secured to an output shaft, and a transmission which receives a portion of driving force to provide additional output. Interruption of power transmission when shifting is prevented. Also, since the construction of the continuously variable transmission is simplified to minimize the load generated due to a shifting operation, power loss resulting from shifting is reduced, and the manufacturing cost is decreased. In particular, since vibration and noise generated upon shifting are decreased, the continuously variable transmission can be widely applied, from a small power device such as a bicycle or a motorcycle to a large power transmission apparatus such as an industrial machine.

2 Claims, 3 Drawing Sheets

CONTINUOUSLY VARIABLE TRANSMISSION

TECHNICAL FIELD

The present invention relates, in general, to a continuously variable transmission, and more particularly, to a continuously variable transmission which comprises a drive shaft having first and second drive gears, a planetary gear unit connected to the drive shaft, a transmission having a shift lever, and so forth, so that the interruption of power transmission is prevented when shifting, and which is simplified in construction to minimize the load generated due to a shifting operation, so that power loss resulting from shifting is reduced, the manufacturing cost is decreased, and the continuously variable transmission can be widely applied, from a small power device to a large power transmission apparatus such as that for an industrial machine.

BACKGROUND ART

As is generally known in the art, a continuously variable transmission comprises a planetary gear unit composed of a ring gear having a predetermined degree of freedom, a planetary gear, a carrier and a sun gear, and a transmission, which are combined with each other in order to construct a belt type continuously variable transmission, so that fine speed adjustment is made possible through continuous shifting, and a wide range of shifting ratios can be obtained.

A belt type continuously variable transmission combined with a planetary gear unit is constructed to transmit power through friction. Therefore, in order to obtain a required level of friction, a substantial amount of power loss is caused due to operation loads and slippage of component parts. Also, since the belt type continuously variable transmission has a complicated structure and low efficiency, it cannot be used in a bicycle or a small power device, and can only be limitedly used in heavy equipment or an industrial machine to which a heavy load is applied.

In the belt type continuously variable transmission, a drive belt is wound on a pair of variable pulleys so that shifting can be implemented by changing the diameters of the pulleys. In order to obtain a high level of speed reduction, the sizes of the pulleys must be relatively increased, and therefore, the size of the entire transmission is enlarged. Also, since the contact area between the belt and the pulleys is increased, operational loads are increased, and it is difficult to apply the belt type continuously variable transmission to intermediate and small power devices.

Meanwhile, in the case of a bicycle, a manual transmission is adopted, in which two or three sprockets are installed on a pedal, and seven or eight sprockets are installed on a rear wheel, such that a chain can be moved through the manipulation of operation levers to effect a speed change. However, in this type of transmission, power transmission is interrupted at the time that the chain is moved through manipulation of the operation levers, and the construction of the transmission is complicated. Also, since two operation levers are used for shifting, usage is inconvenient, and a predetermined degree of skill is required.

Further, in the case of a motorcycle, a belt type continuously variable transmission using centrifugal force produced by engine RPM is adopted. Nevertheless, in this belt type continuously variable transmission, since operation loads of component parts and power loss due to slippage of pulleys are increased, engine RPM is unnecessarily raised, thus decreasing fuel economy and reducing shifting efficiency, and usage of the continuously variable transmission is limited for an engine having a low displacement.

In order to solve the above-described problems, the present applicant disclosed a power classification type continuously variable transmission in Korean Patent No. 436744.

The power classification type continuously variable transmission disclosed in Korean Patent No. 436744 comprises a simple combination of a planetary gear unit composed of a carrier, a ring gear having a predetermined degree of freedom and a sun gear, and a second transmission composed of an oscillation type actuator, that is, cam mechanisms and links, so that a high speed reduction ratio can be conveniently realized, and output and input levels can be adjusted as desired.

Nonetheless, because the power classification type continuously variable transmission has a relatively complicated construction, when it is applied to a simple device and machine, power loss results due to noise or vibration generated while driving force is transmitted from an input section to an output section. Also, the power classification type continuously variable transmission makes it difficult to minimize the weight of a device which is required to be light.

DISCLOSURE OF INVENTION

Technical Problem

Accordingly, the present invention has been made in an effort to solve the problems occurring in the related art, and an object of the present invention is to provide a continuously variable transmission in which a first driving gear meshed with a planetary gear unit having an output shaft and a second driving gear meshed with a transmission connected to the output shaft and capable of implementing a shifting operation are secured to a drive shaft provided with power, to minimize the load generated in the shifting operation and simplify the construction of the continuously variable transmission, so that power loss resulting from shifting is reduced and the continuously variable transmission can be formed to have various sizes, whereby the continuously variable transmission can be applied not only to a small power device but also to a large power transmission apparatus.

Technical Solution

In order to achieve the above object, according to one aspect of the present invention, there is provided a continuously variable transmission using a planetary gear unit, comprising a drive shaft provided with driving force, and having first and second drive gears which are installed on the drive shaft to be spaced apart from each other; a planetary gear unit including a ring gear meshed with the first drive gear of the drive shaft, a sun gear having an output shaft, and a plurality of planetary gears connecting the ring gear and the sun gear with each other; and a transmission including an input shaft which has an input gear meshed with the second drive gear of the drive shaft, a plurality of cam mechanisms eccentrically secured to the input shaft, a plurality of first links which rotatably receive therein the respective cam mechanisms, a plurality of rotators which are coupled to a one-way clutch installed on a shaft for transmitting output power to the planetary gears, and a plurality of second links which have first ends coupled by pins to respective extensions of the first links and second ends coupled by pins to the respective rotators, wherein additional speed change is enabled through the transmission when driving force provided to the drive shaft is transmitted without loss by the first drive gear.

According to another aspect of the present invention, the transmission further includes a plurality of shifting links which have first ends connected to the pins of the extensions of the respective first links and second ends connected to a transmission shaft having a shift lever such that movement ranges of the respective first and second links can be adjusted.

ADVANTAGEOUS EFFECTS

Thanks to the features of the present invention, the continuously variable transmission according to the present invention provides advantages over the prior application by the present applicant in that, since the construction of the continuously variable transmission is simplified to minimize a load generated in a shifting operation, power loss resulting from shifting can be reduced, and the manufacturing cost can be decreased.

Also, in the continuously variable transmission according to the present invention, because vibration and noise generated upon shifting is decreased, the continuously variable transmission can be widely applied, from a small power device such as a bicycle or a motorcycle to a large power transmission apparatus such as an industrial machine, to be utilized in a variety of ways.

BRIEF DESCRIPTION OF THE DRAWINGS

The above objects, and other features and advantages of the present invention will become more apparent after a reading of the following detailed description made in conjunction with the drawings, in which.

Figure 1:
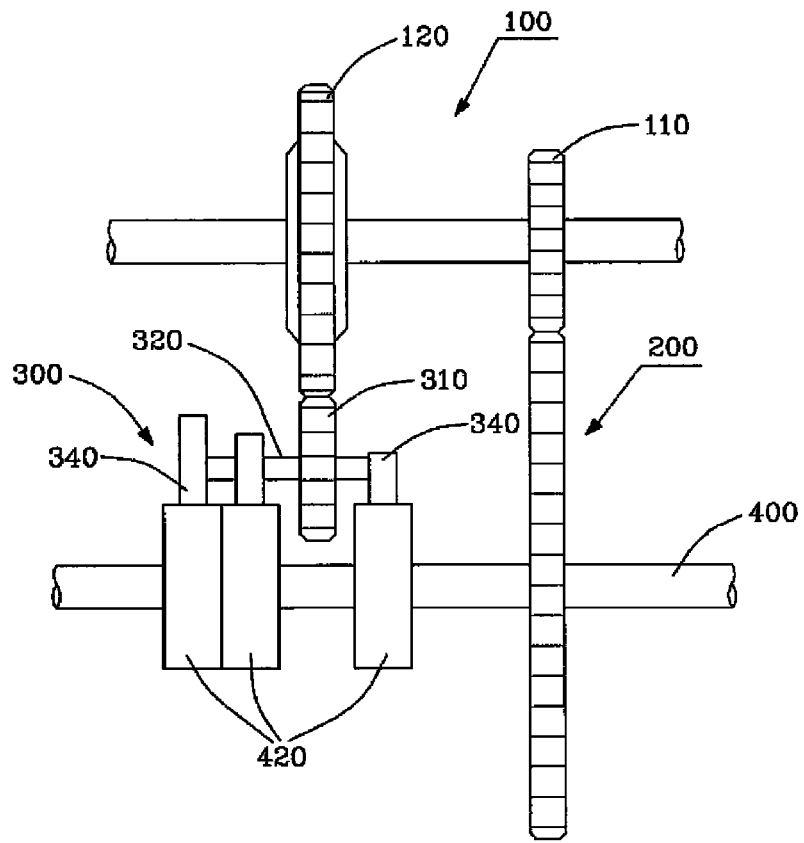
FIG. 1 is a constructional view of a continuously variable transmission according to the present invention.

DESCRIPTION OF REFERENCE NUMERALS
FOR MAIN PARTS OF DRAWINGS

100: drive shaft 200: planetary gear unit
300: transmission 400: output shaft
110: first drive gear 120: second drive gear
210: ring gear 220: sun gear
230: planetary gear 310: input gear
320: input shaft 330: cam mechanism
340: first link 350: second link
360: shift lever 370: shift shaft
410: one-way clutch 420: rotator

BEST MODE FOR CARRYING OUT THE
INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
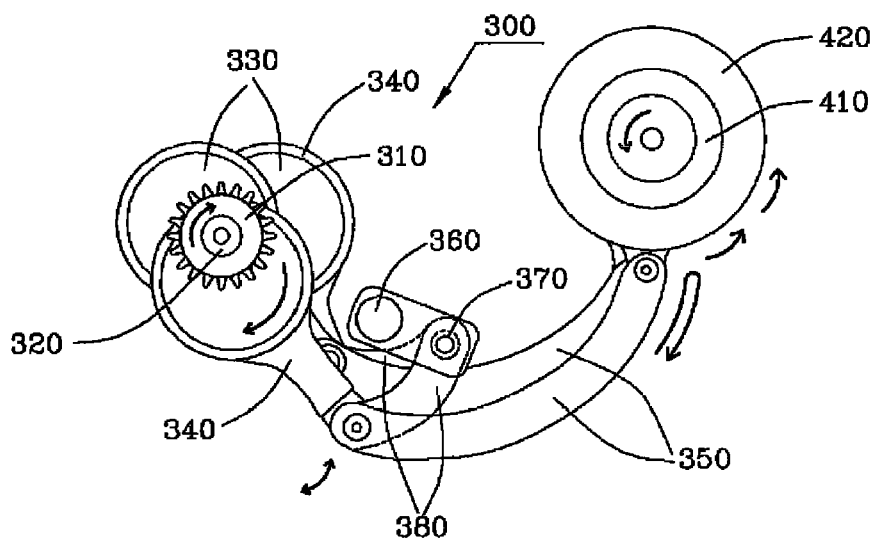
FIG. 2 is a constructional view of a transmission applied to the present invention.
Figure 3:
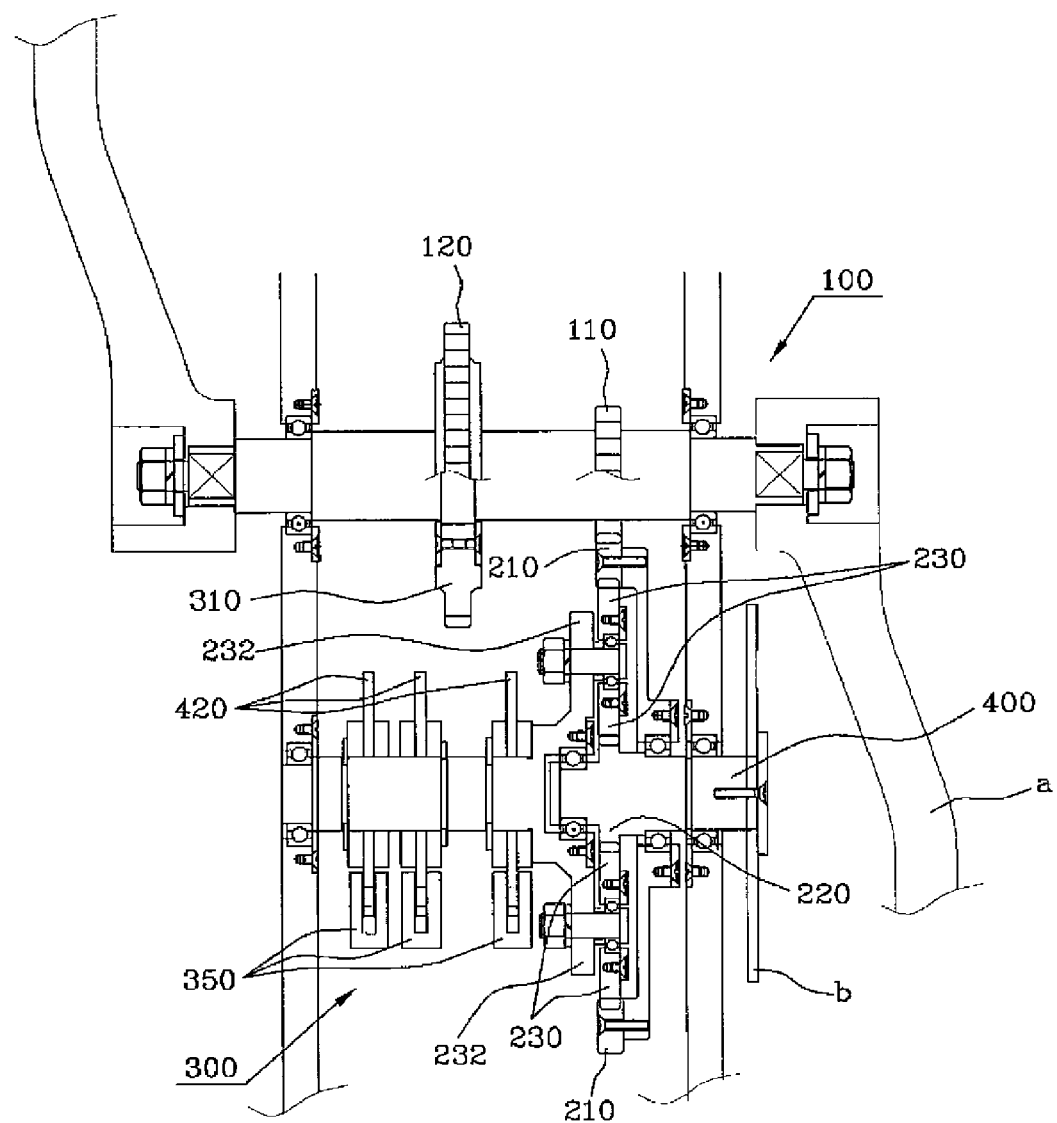
FIG. 3 is a cross-sectional view illustrating one embodiment of the continuously variable transmission according to the present invention.
Figure 4:
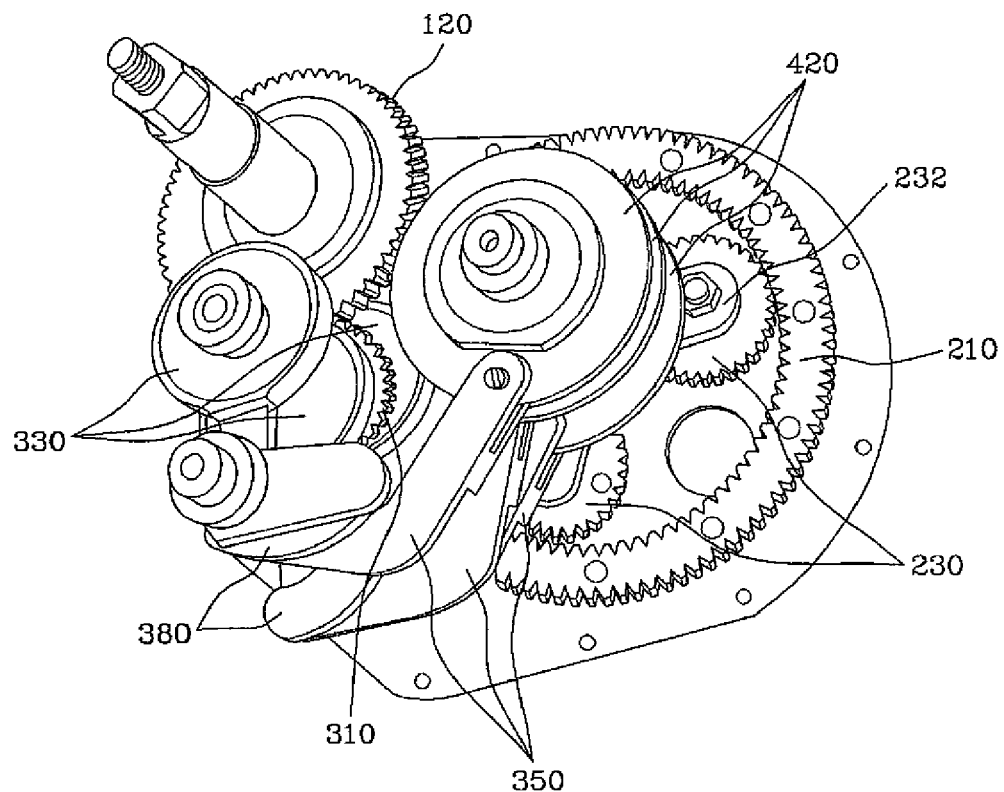
FIG. 4 is an assembled view of the continuously variable transmission shown in FIG. 3.

FIG. 1 is a constructional view of a continuously variable transmission according to the present invention, FIG. 2 is a constructional view of a transmission applied to the present invention, FIG. 3 is a cross-sectional view illustrating one embodiment of the continuously variable transmission according to the present invention, and FIG. 4 is an assembled view of the continuously variable transmission shown in FIG. 3.

A continuously variable transmission in accordance with an embodiment of the present invention largely comprises a drive shaft 100 which has a first drive gear 110 and a second drive gear 120 and is provided with rotational power, a planetary gear unit 200 which is meshed with the first drive gear 110 of the drive shaft 100 and has a sun gear 220 secured to an output shaft 400, and a transmission 300 which enables additional speed change to allow the output force provided through the output shaft 400 to be appropriately adjusted.

The drive shaft 100, to which rotational power produced by an engine or a person's stepping force is provided, is provided with the first and second driving gears 110 and 120 which are spaced apart from each other by a predetermined distance. Preferably, the first drive gear 110 of the drive shaft 100 is meshed with the ring gear 210 of the planetary gear unit 200 to receive the rotational power provided to the drive shaft 100, and the output shaft 400 is connected to the sun gear 220 of the planetary gear unit 200 so that the provided drive force can be output through the sun gear 220.

In particular, preferably, as shown in FIGS. 3 and 4, the planetary gear unit 200 applied to the present invention is structured to have a star-shaped configuration such that the ring gear 210 has internal teeth, a plurality of planetary gears 230 is located to be meshed with the internal teeth of the ring gear 210, and the sun gear 220 is located at the center portion of the ring gear 210 and is meshed with the planetary gears 230. Also, preferably, the second drive gear 120 of the drive shaft 100 is meshed with the input gear 310 of the transmission 300 such that the driving force provided to the drive shaft 100 is transmitted through the transmission 300 to the output shaft 400 which is driven by the first drive gear 100 and the planetary gear unit 200 without undergoing speed change, to implement speed change of the output power.

Referring to FIG. 2, the transmission 300 receives driving force through the input gear 310 which is meshed with the second drive gear 120 of the drive shaft 100, and finally implements selective speed change for the rotators 420 coupled to a one-way clutch 410 which is installed on the output shaft 400, to transmit the driving force.

Concretely describing the construction of the transmission 300, it is preferred that the transmission 300 comprise an input shaft 320 which has the input gear 310 meshed with the second drive gear 120 of the drive shaft 100, a plurality of cam mechanisms 330 which are eccentrically secured to the input shaft 320, a plurality of first links 340 which rotatably receive therein the respective cam mechanisms 330, and a plurality of second links 350 which have first ends coupled by pins to the respective extensions of the first links 340 and second ends coupled by pins to first ends of a plurality of rotators 420 coupled to the one-way clutch 410 secured to the output shaft 400 of the planetary gear unit 200.

Also, more preferably, the transmission 300 further comprises a plurality of shifting links 380 which have first ends connected to the pins of the extensions of the respective first links 340 and second ends connected to a transmission shaft 370 having a shift lever 360, so that the movement ranges of the respective first and second links 340 and 350 can be appropriately adjusted through the manipulation of the shift lever 360 to set the rotation ratio of the output shaft 400 as desired.

Hereafter, operation of the transmission 300 constructed as mentioned above will be described with reference to FIG. 2. If the input gear 310 is rotated by the second drive gear 120, the plurality of cam mechanisms 330 which are eccentrically secured to the shaft 320 of the input gear 310 are rotated. By this fact, the first links 340, which rotatably receive therein the respective cam mechanisms 330, linearly reciprocate due to the rotation of the cam mechanisms 330, and the second links 350, which are coupled to one ends of the first links 340 by the pins, also linearly reciprocate.

The linear reciprocating motions of the second links 350 repeatedly rotate the rotators 420 connected to the second links 350 in forward and backward directions through a predetermined angle. Since the rotators 420 are coupled to the one-way clutch 410, among the rotations of the rotators 420, output is increased by the amount of the rotation angle only when the rotators 420 are rotated in the forward direction, and this additional output of the rotators 420 is exhibited as the additional output of the sun gear 220. Meanwhile, if the shift lever 360 is appropriately adjusted, the movement range when the first and second links 340 and 350 linearly reciprocate can be adjusted. This movement range corresponds to the rotation range between the forward rotation and the backward rotation of the rotators 420, as a result of which the rotation ratio of the output shaft 400 can be adjusted. The concrete operational construction of the present invention, such that output is increased by the rotation of the rotators 420, will be described in detail in the following concrete embodiment.

An embodiment in which the continuously variable transmission according to the present invention is applied to a bicycle will be described with reference to FIGS. 3 and 4. FIG. 3 is a cross-sectional view illustrating a state in which the continuously variable transmission according to the present invention is mounted to a bicycle, and FIG. 4 illustrates the assembly of and relationship between the main component parts shown in FIG. 3.

Preferably, in the case where the continuously variable transmission of the present invention is applied to a bicycle, a person's stepping force is transferred through the drive shaft 100 connected to the pedal 'a' of the bicycle, and a sprocket 'b' which is connected with a chain for transmitting driving force to the rear wheel of the bicycle, is secured to the output shaft 400.

When the pedal 'a' is rotated by the stepping force of a person riding on the bicycle, the drive shaft 100 coupled to the pedal 'a' is rotated, and the first and second drive gears 110 and 120 secured to the drive shaft 100 are rotated. Also, if the first drive gear 110 is rotated, the ring gear 210 of the planetary gear unit 200 is rotated. If the ring gear 210 is rotated, due to the characteristic of the planetary gear unit 200, the planetary gears 230 meshed with the ring gear 210 and the sun gear 220 meshed with the planetary gears 230 are rotated, to provide a basic output through the output shaft 400.

Meanwhile, referring to FIG. 4, as the second drive gear 120 is rotated, the input gear 310 of the transmission 300 is also rotated, and the plurality of cam mechanisms 330 secured to the input shaft 320 is rotated. The rotation of the cam mechanisms 330 linearly reciprocates the first links 340 which rotatably receive the cam mechanisms 330 and the second links 350 which are coupled by the pins to one ends of the first links 340. The linear reciprocating movement of the second links 350 repeatedly implements rotation of the rotators 420 connected to the ends of the second links 350 through a predetermined angle in the forward and backward directions.

Because the rotators 420 are coupled to the one-way clutch 410, the rotational force of the rotators 420 is transmitted to the planetary gears 230 through planetary gear fastening parts 232 only when the rotators 420 are rotated in the forward direction. This rotation in the forward direction causes the planetary gears 230 to revolve on the circumferential inner surface of the ring gear 210, and as a result, provides additional output to the output shaft 400 of the sun gear 220, which is meshed with the planetary gears 230. The additional power can be provided due to the fact that, in the planetary gear unit, the planetary gears can be moved on the circumferential inner surface of the ring gear regardless of the rotation of the ring gear. Consequently, the final output of the output shaft 400 is provided in a pattern such that the basic output attributable to the rotation of the first drive gear 110 and additional output attributable to the rotation of the rotators 420 are combined.

Specifically, as described above, the rotational ratio of the output shaft 400 can be set by manipulating the plurality of shifting links 380 connected to one ends of the plurality of first links 340 using the shift lever 360. Also, the shift lever 360 (not shown in FIG. 3) of the transmission 300 can be connected to the handle of the bicycle by a wire, etc. to permit convenient manipulation of the shift lever 360.

Although a description has been made of the case where the continuously variable transmission according to the present invention, constructed as mentioned above, is applied to a bicycle, it is to be readily understood that the present invention is not limited to this particular case, and can perform the same function even when it is applied to various apparatuses such a vehicle.

In the drawings and specification, typical preferred embodiments of the invention have been disclosed, and, although specific terms are employed, they are used in a generic and descriptive sense only and not for purposes of limitation, the scope of the invention being set forth in the following claims.

The invention claimed is:

1. A continuously variable transmission using a planetary gear unit, comprising:
   a drive shaft provided with driving force, and having first and second drive gears which are installed on the drive shaft to be spaced apart from each other;
   a planetary gear unit including a ring gear meshed with the first drive gear of the drive shaft, a sun gear having an output shaft, and a plurality of planetary gears connecting the ring gear and the sun gear with each other; and
   a transmission including an input shaft which has an input gear meshed with the second drive gear of the drive shaft, a plurality of cam mechanisms eccentrically secured to the input shaft, a plurality of first links which rotatably receive therein the respective cam mechanisms, a plurality of rotators which are coupled to a one-way clutch installed on a shaft for transmitting output power to the planetary gears, and a plurality of second links which have first ends coupled by pins to respective extensions of the first links and second ends coupled by pins to the respective rotators,
   wherein additional speed change is enabled through the transmission when driving force provided to the drive shaft is transmitted without loss by the first drive gear.

2. The continuously variable transmission as set forth in claim 1, wherein the transmission further includes a plurality of shifting links which have first ends connected to the pins of the extensions of the respective first links and second ends connected to a transmission shaft having a shift lever such that movement ranges of the respective first and second links can be adjusted.

\* \* \* \* \*